(12) United States Patent
Schroeder

(10) Patent No.: US 7,433,268 B1
(45) Date of Patent: ***Oct. 7, 2008

(54) VESSEL HULL TRANSDUCER MODULAR MOUNTING SYSTEM

(75) Inventor: Terrence K. Schroeder, Bernardsville, NJ (US)

(73) Assignee: SWCE, Bernardsville, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/805,064

(22) Filed: May 21, 2007

Related U.S. Application Data

(63) Continuation of application No. 11/078,901, filed on Mar. 11, 2005, now Pat. No. 7,236,427.

(51) Int. Cl.
*H04R 1/02* (2006.01)
(52) U.S. Cl. ...................................... 367/188
(58) Field of Classification Search ................ 367/165, 367/173, 188; 248/689, 560, 562, 636, 576, 248/577, 623, 578, 565
See application file for complete search history.

(56) References Cited

U.S. PATENT DOCUMENTS

| | | |
|---|---|---|
| 3,039,078 A | 6/1962 | Wilcoxon |
| 3,753,219 A | 8/1973 | King, Jr. |
| 4,156,228 A | 5/1979 | Heckman |
| 4,815,048 A | 3/1989 | Boucher et al. |
| 4,897,824 A | 1/1990 | Stokes |
| 5,353,263 A | 10/1994 | Pakker et al. |
| 5,602,801 A | 2/1997 | Nussbaum et al. |
| 5,673,171 A * | 9/1997 | Varghese et al. ............ 361/685 |
| 5,878,000 A | 3/1999 | Dubois |
| 6,019,333 A | 2/2000 | Waller |
| 6,046,963 A | 4/2000 | Glenning |
| 6,094,402 A | 7/2000 | Cooper et al. |
| 7,236,427 B1 | 6/2007 | Schroeder |
| 2002/0067662 A1 | 6/2002 | Carney |

OTHER PUBLICATIONS

Cook, Melvin A., "The Science of High Explosives", 1958, Reinhold Publishing Corporation, New York.
Cook, Melvin A., "The Science of Industrial Explosives", 1974, IRECO Chemicals, Utah.
Walters, W.P. and Zukas, J.A., "Fundamentals of Shaped Charges", 1998, CMC Press, Maryland.
Walters, W.P. and Zukas, J.A., "Explosive Effects and Applications", 1998, Springer-Verlag New York, Inc., New York.
Kirkwood, John Gamble, "John Gamble Kirkwood Collected Works, Shock and Detonation Waves", 1967, Gordon and Breach Science Publishers, Inc., New York.

(Continued)

*Primary Examiner*—Dan Pihulic
(74) *Attorney, Agent, or Firm*—Mathews, Shepherd, McKay & Bruneau, P.A.

(57) ABSTRACT

A vessel hull transducer modular mounting system enables transducers to be replaced and upgraded without necessitating the further modification of the hull and thus not necessitating the dry-docking of the vessel. A further feature includes the ability to reduce and dampen acoustic shock impact on the transducer. Another feature includes the ability to extend and retract the transducer which can operate in bottom scan, forward looking, side scan, searchlight, and sweep modes.

20 Claims, 8 Drawing Sheets

OTHER PUBLICATIONS

Kolsky, H., "Stress Waves in Solids", 1963, Dover Publications, Inc., New York.

Fickett, W. and Davis, W.C., "Detonation: Theory and Experiment", 1979, Dover Publications, Inc., New York.

Cole, R. H., "Underwater Explosions", 1948, Dover Publications, Inc., New York.

Mader, C.L., "Numerical Modeling of Detonations", 1979, University of California Press, California.

Mader, C.L., "Numerical Modeling of Explosives and Propellants—Second Edition", 1998, CRC Press, New York.

Cooper, P.W. et al., "Introduction to the Technology of Explosives", 1996, VCH Publishers, Inc., New York.

Cooper, P.W., "Explosives Engineering", 1996, VCH Publishers, Inc., New York.

Wang, X., "Emulsion Explosives", 1994, Metallurgical Industry Press, Beijing, China.

Siegel, B. et al., "Energetics of Propellent Chemistry", 1964, John Wiley & Sons Inc., New York.

Kit, B. et al., "Rocket Propellant Handbook", 1960, The Macmillan Company, New York.

Nielsen, Arnold T., "Nitrocarbons", 1995, VCH Publishers, Inc., New York.

Pelter et al., "Borane Reagents", 1988, Academic Press Limited, London, England.

Roy, G.D., "Advances in Chemical Propulsion, Science to Technology", 2002, CRC Press LLC, Florida.

Kubota, N., "Propellants and Explosives, Thermochemical Aspects of Combustion", 2002, Wiley-VCH GmbH, Weinheim, Germany.

Lipanov, A.M., "Theory of Combustion of Powder and Explosives", 1996, Nova Science Publishers, Inc., New York.

Machacek, O., "Application of Demilitarized Gun and Rocket Propellants in Commerical Explosives", 2000, Kluwer Academic Publishers, Boston.

Köhler, J. et al., "Explosives. Fourth Revised and Extended Edition", 1993, VCH Verlagsgesellschaft GmbH, Weinheim, Germany.

Meyer et al., "Explosives. Fifth, Completely Revised Edition", 2002, Wiley-VCH Verlagsgesellschaft GmbH, Weinheim, Germany.

Suceska, M., "Test Methods for Explosives", 1995, Springer-Verlag, New York.

Davis, T.L., "The Chemistry of Powder and Explosives", 1944, Angriff Press, Nevada.

International Society of Explosives Engineers, "Blasters' Handbook, 17th Edition", 1998, International Society of Explosives Engineers, Inc., Ohio.

Lanchaster, R., "Fireworks, Principles and Practice, 3rd Edition", 1998, Chemical Publishing Co., Inc., New York.

Conkling, J.A., "Chemistry of Pyrotechnics, Basic Principles and Theory", 1985, Marcel Dekker, Inc., New York.

Yinon, J., "Forensic and Environmental Detection of Explosives", 1999, John Wiley & Sons, LTD, New York.

Yinon, J. et al. , "Modern Methods and Applications in Analysis of Explosives", 1993, John Wiley & Sons, LTD., New York.

Beveridge, A., "Forensic Investigation of Explosions", 1998, Taylor & Francis Ltd., London.

Bulson, P.S., "Explosive Loading of Engineering Structures; A history of research and a review of recent developments", 1997, E & FN Spon, New York.

Anderson, T.L., "Fracture Mechanics, Fundamentals and Applications, Second Edition", 1995, CRC Press, Inc., New York.

Whittaker et al., "Rock Fracture Mechanics, Principles, Design and Applications", 1992, Elsevier Science Publishers B.V., New York.

Charlez, P.A., "Rock Mechanics, Theoretical Fundamentals, vol. 1", 1991, Gulf Publishing Company, Texas.

Zangwil, A., "Physics at Surfaces", 1988, Cambridge University Press, New York.

Wall, F.T., "Chemical Thermodynamics, A Course of Study, Second Edition", 1958, 1965, W.H. Freeman and Company, San Franciso.

Kreith, F. et al. "The CRC Handbook of Thermal Engineering", 2000, CRC Press LLC, New York.

Castellan, G.W., "Physical Chemistry", 1964, Addison-Wesley Publishing Company, Inc., London.

Atkins, P.W., "Physical Chemistry, Third Edition", 1978, 1982, 1986, W.H. Freeman and Company, New York.

Raemer, H.R., "Radar Systems Principles", 1997, CRC Press LLC, New York.

Taylor, J.D. et al. "Ultra-Wideband Radar Technology", 2001, CRC Press LLC, New York.

Mahafza, B.R., "Radar Systems Analysis and Design Using MATLAB", 2000, Chapman & Hall/CRC, New York.

Franceschetti, G. et al., "Synthetic Perture Radar Processing", 1999, CRC Press LLC, New York.

Mahafza, B.R., "Introduction to Radar Analysis", 1998, CRC Press LLC, New York.

Sanchez, J. et al., "Space Image Processing", 1999, CRC Press LLC, New York.

Sabins, F.F., "Remote Sensing, Principles and Interpretation, Second Edition", 1978, W.H. Freeman and Company, New York.

Kreyszig, E., "Advanced Engineering Mathematics, Third Edition", 1962, 1967, 1972, John Wiley & Sons, Inc., New York.

Rabenstein, A.L., "Introduction to Ordinary Differential Equations", 1966, Academic Press, Inc., New York.

Adeli, H. et al., "High-Performance Computing in Structural Engineering", 1999, CRC Press LLC, New York.

Lancaster, P. et al., "Curve and Surface Fitting, An Introduction", 1986, Academic Press, New York.

Lyche, T. et al., "Mathematical Methods in Computer Aided Geometric Design", 1989, Academic Press, New York.

Farin, G., "Curves and Surfaces for Computer Aided Geometric Design, A Practical Guide", 1990, Academic Press, Inc., New York.

Bu-Qing, S. et al., "Computational Geometry, Curve and Surface Modeling", 1989, Academic Press, Inc., New York.

Beltrami, E., "Mathematics for Dynamics Modeling", 1987, Acadmic Press, Inc., New York.

Korn, G.A., "Interactive Dynamic System Simulation", 1989, McGraw-Hill Book Company, New York.

Sedgewick, R., "Algorithms", Reading, 1983, Addison-Wesley Publishing Company, Inc., Massachusetts.

Kohn, M.C., "Practical Numerical Methods Algorithms and Programs", 1987, Macmillan Publishing Company, New York.

Pearson, C.E., "Numerical Methods in Engineering and Science", 1986, Van Nostrand Reinhold Company, Inc., New York.

Wells, D.A., "Schaum's Outline of Theory and Problems of Lagrangian Dynamics with a treatment of Euler's Equations of Motion, Hamilton's Principle", 1967, Schaum's Outline Series, McGraw-Hill Book Compa, New York.

Spiegel, M.R., "Schaum's Outline of Theory and Problems of Vector Analysis and an Introduction to Tensor Analysis", 1959, Schaum Publishing Company, New York.

Hughes, O. F., "Ship Structural Design, a Rationally-Based, Computer-Aided Optimization Approach", 1988, The Society of Naval Architects and Marine Engineers, Jersey City, New Jersey.

Saunders, H.E., "Hydrodynamics in Ship Design", vol. 1, 1957, The Society of Naval Architects and Marine Engineers, New York.

Saunders, H.E., "Hydrodynamics in Ship Design", vol. 2, 1957, The Society of Naval Architects and Marine Engineers, New York.

Saunders, H.E., "Hydrodynamics in Ship Design, Author's Notes for vol. 3 on Maneuvering and Wavegoing", 1965, The Society of Naval Architects and Marine Engineers, second printing 1982, New York.

Lewis, E.V., "Principles of Naval Architecture, Second Revision, Stability and Strength", vol. I, 1988, The Society of Naval Architects and Marine Engineers, New York.

Lewis, E.V., "Principles of Naval Architecture, Second Revision, Resistance, Propulsion and Vibration" vol. II, 1988, The Society of Naval Architects and Marine Engineers, Jersey City, New Jersey.

Lewis, E.V., "Principles of Naval Architecture, Second Revision, Motions in Waves and Controllability", vol. III, 1989, The Society of Naval Architects and Marine Engineers, Jersey City, New Jersey.

Taggart, R., "Ship Design and Construction", 1980, The Society of Naval Architects and Marine Engineers, New York.

Allmendinger, E., "Submersible Vehicle Systems Design", 1990, The Society of Naval Architects and Marine Engineers, Jersey City, New Jersey.

Harrington, R.L., "Marine Engineering", 1971, The Society of Naval Architects and Marine Engineers, New York.

Lide, D.R., "CRC Handbook of Chemistry and Physics", 2000, CRC Press, Inc., New York.

Airmar Technology Corporation, "Piezoflex Polymer Transducers, Open Opportunities", pp. 1-6, Milford, New Hampshire 03055-4613 USA.

Airmar Technology Corporation, "Airman Product Catalog 2000-2001", pp. 1-50, Milford, New Hampshire 03055-4613 USA.

Airmar Technology Corporation, "Airman Product Catalog", pp. 237-267, Milford, New Hampshire 03055-4613 USA.

* cited by examiner

VESSEL HULL TRANSDUCER MODULAR MOUNTING SYSTEM

CROSS REFERENCES TO RELATED APPLICATIONS

This application is a continuation of U.S. patent application Ser. No. 11/078,901 filed Mar. 11, 2005, the entirety of each of which is hereby incorporated by reference into this application.

FIELD OF INVENTION

The present invention relates to vessel hulls and more particularly to the mounting of transducers.

BACKGROUND OF THE INVENTION

Transducers, such as' acoustic transducers are employed by a vessel for mapping and locating. Transducers direct a number of streams of energy, such as sonar or other pulsed energy towards the bottom of the water while the vessel transverses the location. The transducer receives reflected signals from the water bottom, or an intervening object (such as fish, a diver, torpedo or submarine). The raw signal is translated and processed into a map of the water bottom, and/or the contents of the water. The systems are sometimes integrated with a navigational and guidance system, utilizing global positioning satellite (GPS) navigational technology, to provide accurate data and information.

In the past, transducers were hung over the side of or behind a vessel. This system has the disadvantage that the transducer is subject to noise from the vessel's engine and the turbulent movement of the water around the transducer and against the hull. Undesirable noise interference compromises the ability of the transducer to provide a clear and highly useable signal. Such mounting is also highly vulnerable to damage from floating objects, impact when docking, concussion from underwater detonation (such as mines) as well as stresses induced by the motion of waves.

More recently, thru-hull mounting of transducers has been utilized as an alternative. They have been typically limited to use with fiberglass and metal hulls, as wood hulls swell and shrink, inducing substantial stress and/or resulting in loss of mounting and waterproof integrity. Thru-hull transducer mountings are primarily retrofitted systems. The hull is cut to an opening sufficiently large to accommodate the transducer, which is then mounted flush with the use of a sealant and an optional isolation bushing. When a fiberglass hull is cut, the opening should be re-glassed and/or sealed in order to retain integrity of the hull near the cut. Changing and/or replacing a transducer frequently necessitates the hull be re-cut and the new or replacement transducer hacked into place. This requires that the vessel be dry-docked.

Most thru-hull transducer installations require a custom cut fairing as nearly all vessels have some dead-rise angle at the mounting location of the transducer. When a fairing and backing block is used to level the transducer the hull is still cut and raises the same concerns. The fairing and backing block are matched to a particular style and type of transducer. At the very minimum they are epoxied into place.

Thru-hull transducer installations result in weakened hull integrity, as well as make the transducers more susceptible to damage. Transducers such as solid-state phased array sonar as well as conventional transducers are damaged at significantly lower pressures than that required to buckle or cause failure in adjacent fiberglass or metal hull plate areas. Small explosive charges which are used for the purpose of blinding a vessel typically generate acoustic wave profiles sufficient to damage the transducer without damaging the hull.

Therefore, there is a need for a vessel hull transducer modular mounting system which enables transducers to be replaced and upgraded without necessitating the further modification of the hull and thus not necessitating the dry-docking of the vessel.

SUMMARY OF THE INVENTION

The present invention is a vessel hull transducer modular mounting system which enables transducers to be replaced and upgraded without necessitating the further modification of the hull and thus not necessitating the dry-docking of the vessel.

A further feature of the present invention includes the ability to reduce and dampen acoustic shock impact on the transducer.

Another feature of the present invention includes the ability to extend and retract the transducer.

BRIEF DESCRIPTION OF THE DRAWINGS

A more complete understanding of the present invention may be obtained from consideration of the following description in conjunction with the drawings in which.

DETAILED DESCRIPTION OF VARIOUS ILLUSTRATIVE EMBODIMENTS

The present invention is a vessel hull transducer modular mounting system which enables transducers to be replaced and upgraded without necessitating the further modification of the hull and thus not necessitating the dry-docking of the vessel. A further feature of the present invention includes the ability to reduce and dampen acoustic shock impact on the transducer. Another feature of the present invention includes the ability to extend and retract the transducer.

Figure 1:
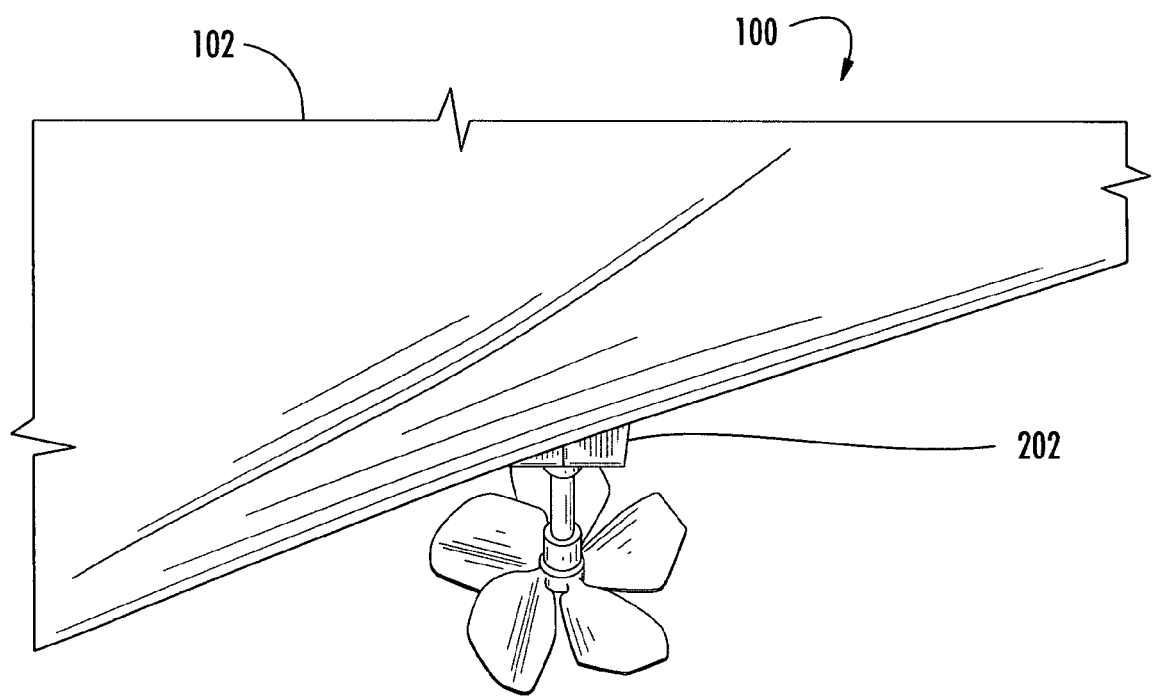
FIG. 1 is a view of a portion of the vessel hull showing the transducer modular mounting system looking from the bow towards the stern under the vessel.

Referring to FIG. 1 there is shown a view of a portion of the vessel hull showing the transducer modular mounting system looking from the bow towards the stern under the vessel. Looking from the bow towards the stern from under the vessel 100 the exterior fairing 202 of the present invention transducer modular mounting system can be seen integrated into the vessel hull 102 of the vessel 100.

Figure 2:
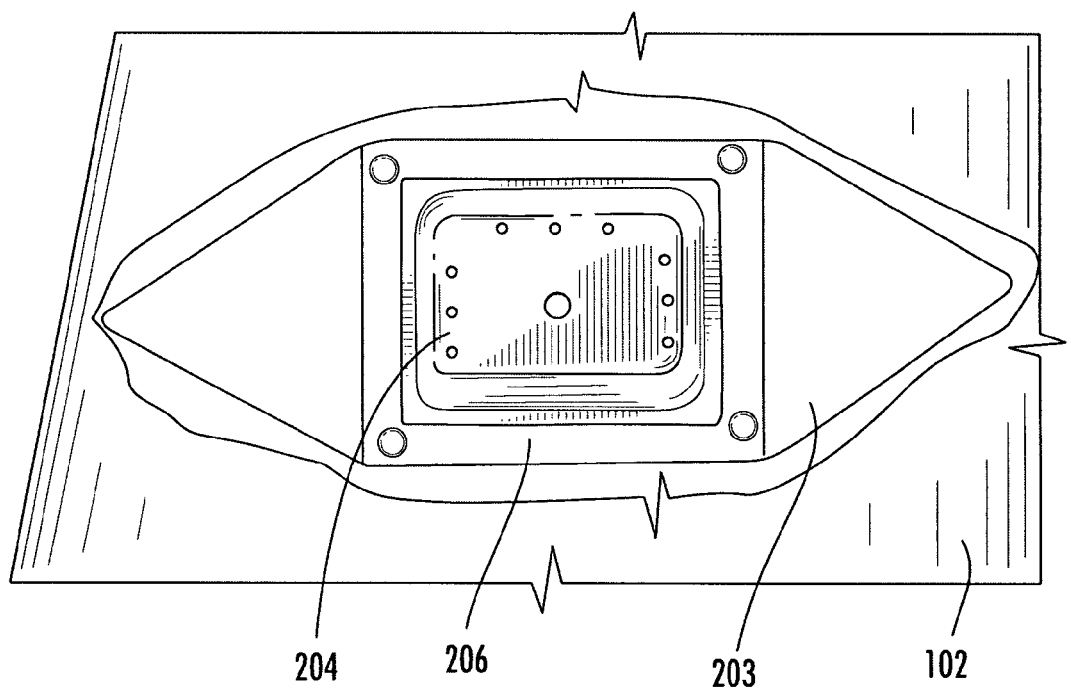
FIG. 2 is a close up view of a portion of the vessel hull showing the transducer modular mounting system looking from the bottom of the vessel up into the hull (with the transducer and support cage removed)

Referring to FIG. 2 there is shown a close up view of a portion of the vessel hull showing the transducer modular mounting system looking from the bottom of the vessel up into the hull (with the transducer and support cage removed). Looking from the bottom up into the vessel hull 102, with the transducer and support cage removed the exterior fairing 202 of the present invention transducer modular mounting system can be seen. The fairing 202 has a recessed lip 206 which enables the support cage to be flush with the fairing 202. Looking into the vessel hull 102 the interior housing 204 can be seen in which the support cage (not shown) and the transducer (not shown) sit.

Figure 3:
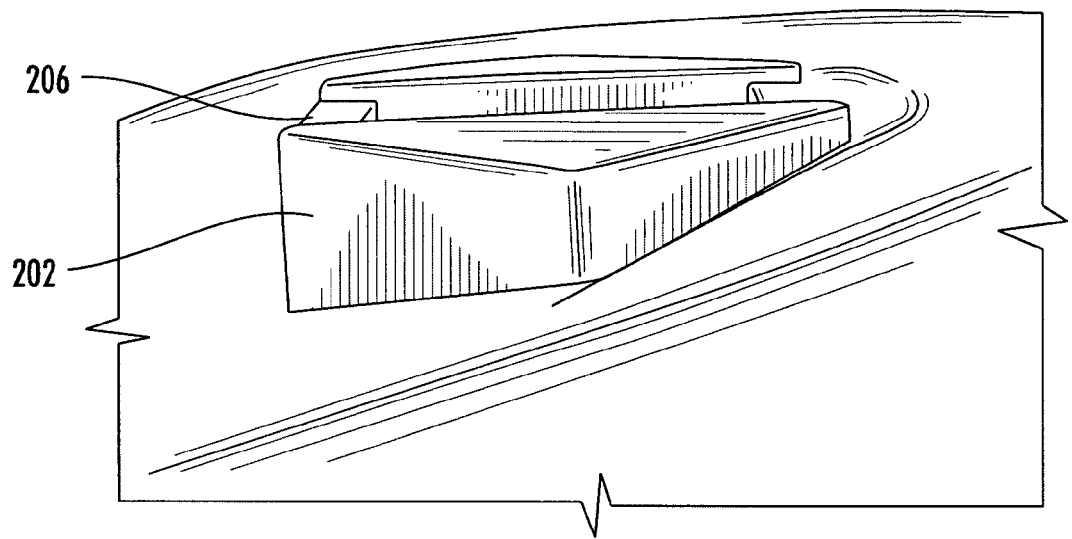
FIG. 3 is a close up view of a portion of the vessel hull showing the transducer modular mounting system looking from the bow towards the stern under the vessel (with the transducer and support cage removed)

Referring to FIG. 3 there is shown a close up view of a portion of the vessel hull showing the transducer modular mounting system looking from the bow towards the stern under the vessel (with the transducer and support cage removed). Looking from the bow towards the stern under the vessel 100 (with the transducer and support cage removed) the exterior fairing 202 of the present invention transducer modular mounting system can be seen integrated into the vessel hull 102. This results in the exterior fairing 202 being structurally integral to the hull. The recessed lip 206 which enables the support cage to be flush with the fairing 202 is also shown.

Figure 4:
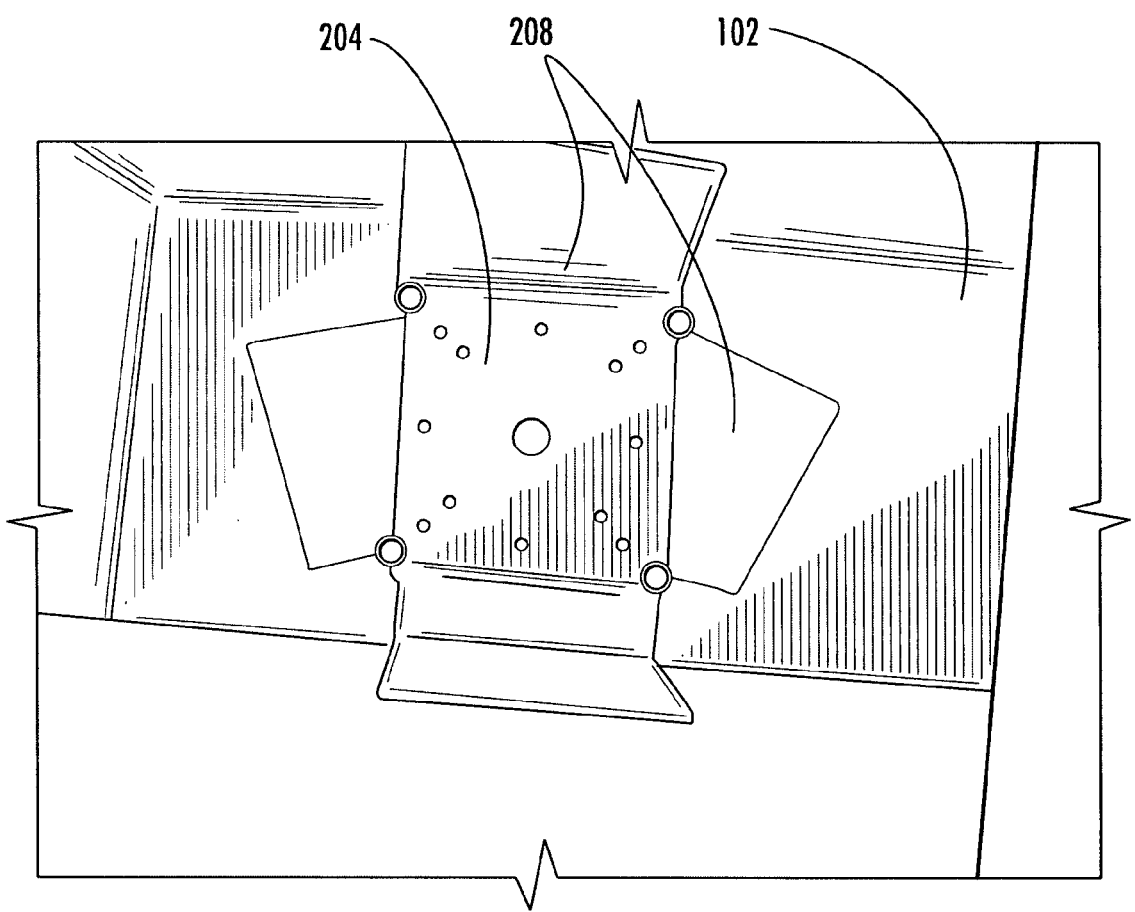
FIG. 4 is a close up view of a portion of the vessel hull showing the transducer modular mounting system looking from the top of the vessel down into the hull (with the transducer and support cage removed)

Referring to FIG. 4 there is shown a close up view of a portion of the vessel hull showing the transducer modular mounting system looking from the top of the vessel down into the hull (with the transducer and support cage removed). Looking from the top down into the vessel hull 102, with the transducer and support cage not installed, interior housing 204 can be seen which is bonded as an integral part to the vessel hull 102 by overlapping fiberglass sheets 208. This results in the interior housing being structurally integral to the hull.

Figure 5:
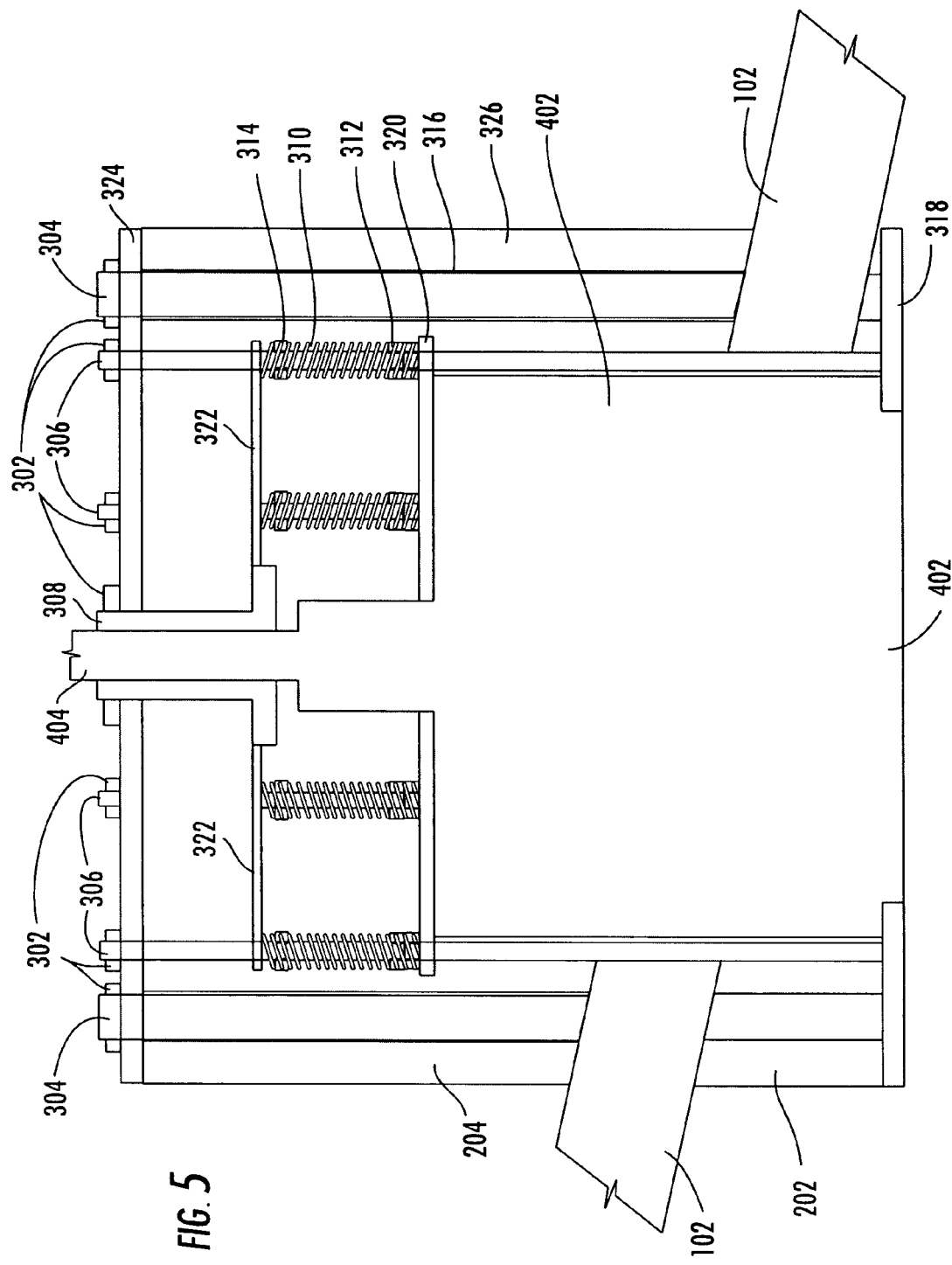
FIG. 5 is a cross sectional view of a portion of the vessel hull showing the transducer modular mounting system looking from the bow towards the stern under the vessel with the transducer and support cage installed.

Referring to FIG. 5 there is shown cross sectional view of a portion of the vessel hull showing the transducer modular mounting system looking from the bow towards the stern under the vessel with the transducer and support cage installed. The vessel hull 102 is shown with fairing 202 bonded in position and transducer 402 installed. Transducer cable 404 extends from transducer 402. The support cage 300 is shown with structural support bolts 304, transducer support bolts 306, retention nuts 302, stuffing tube 308, compression spring 310, slide bushing 312, limit nut 314, support guide tube 316, support plate 318, transducer retention plate 320, internal housing material 204, and thrust plate 322.

Figure 6:
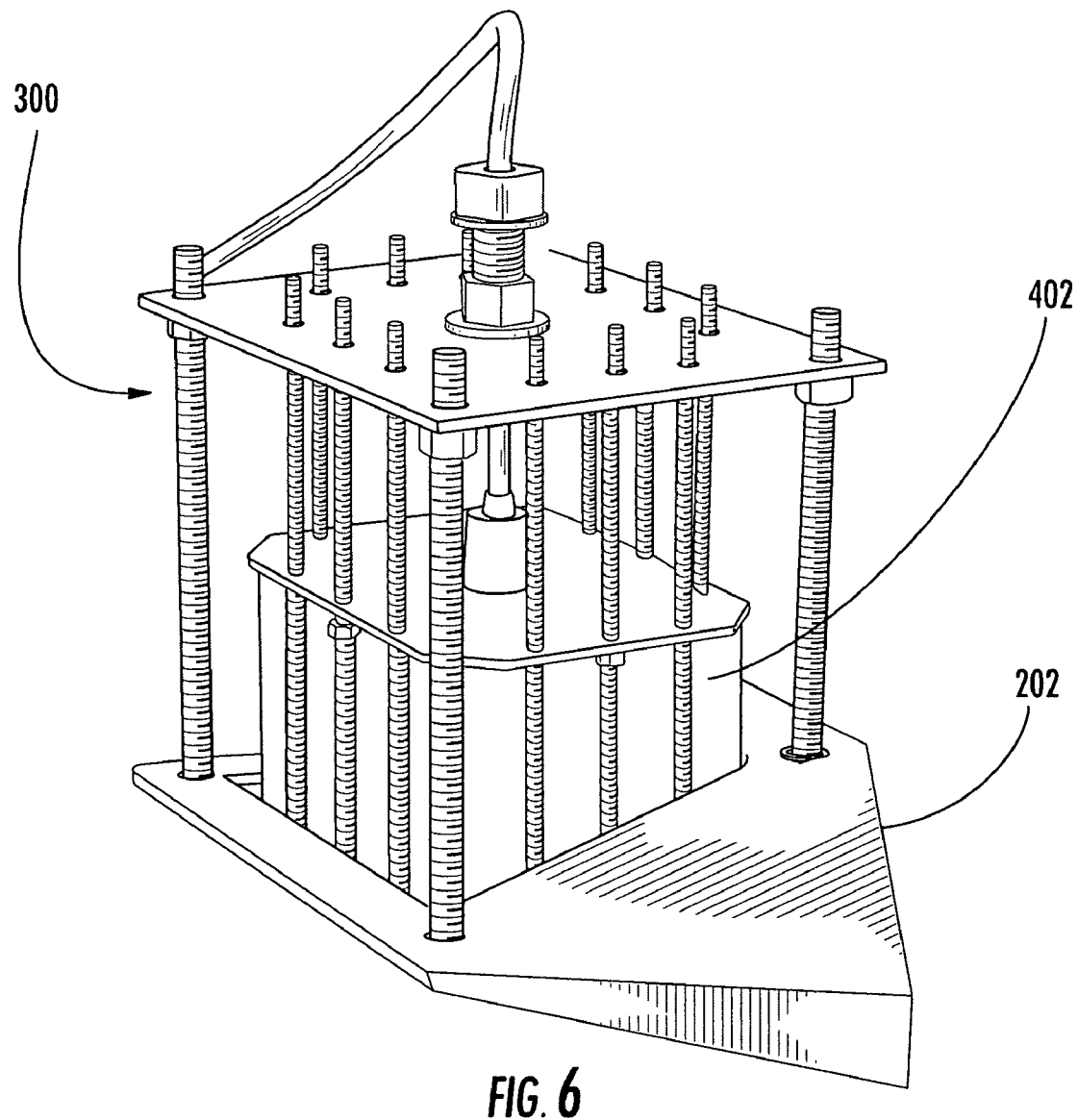
FIG. 6 is a close up view of the fairing with the transducer and support cage installed but not attached to the vessel hull.

While the system is shown with simple compression springs 310, a combination of gas struts and springs in parallel as well as in series can be used. In addition to coil springs, leaf springs, and other suitable resilient materials can be used. The compression springs 310 can also be selected with a variable progressive spring constant. Referring to FIG. 6 there is shown a close up view of the fairing 202 with the transducer and support cage installed but not attached to the vessel hull 102. The positioning of the support cage 300 and the transducer 402 can be seen as it would appear from the interior of the vessel 100 with the vessel hull 102 and the interior housing 204 not shown.

Figure 7:
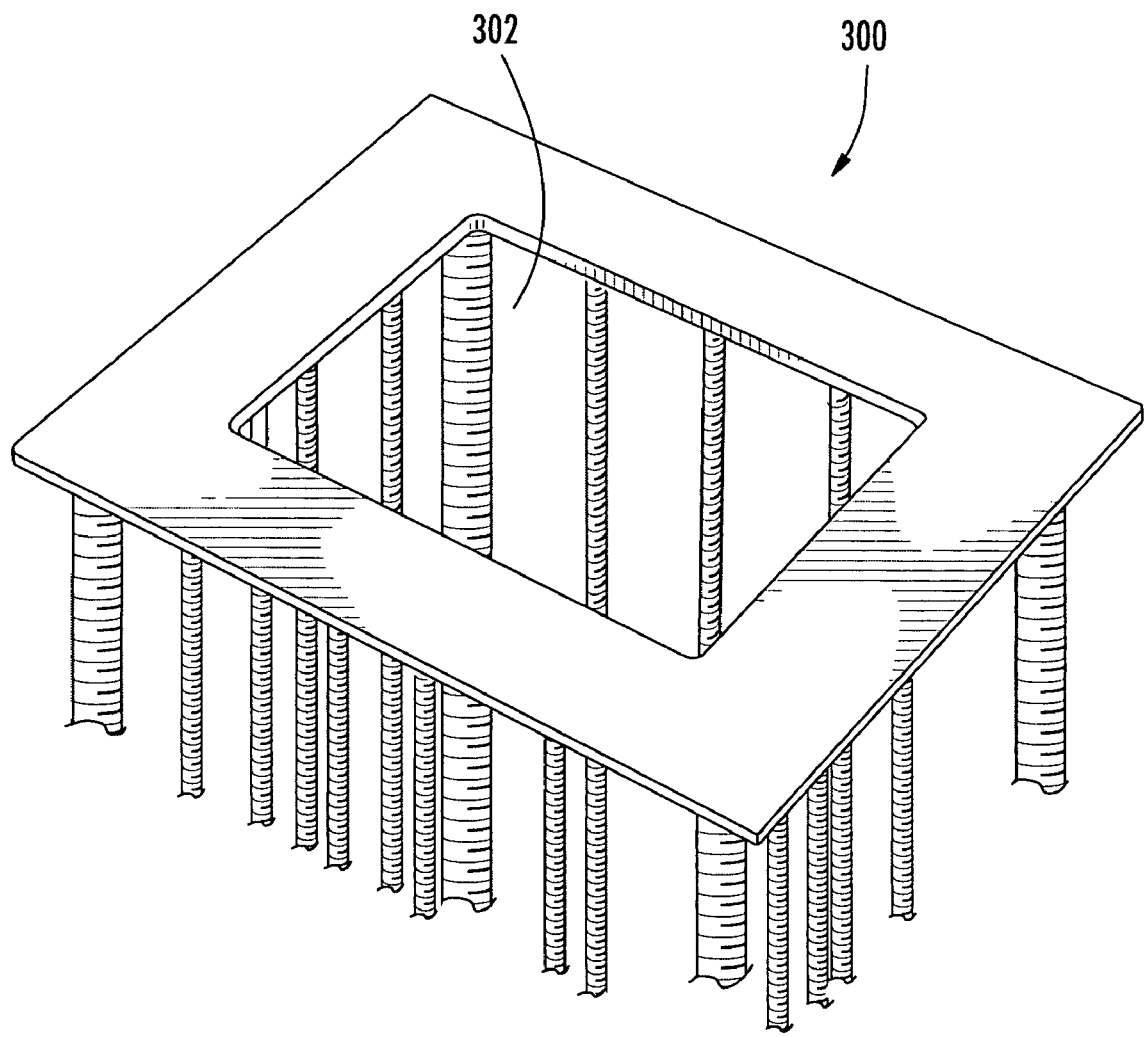
FIG. 7 is a close up perspective view of the bottom of the support cage.

Referring to FIG. 7 there is shown a close up perspective view of the bottom of the support cage 300 with transducer face opening 302. The support cage 300 can have a different transducer face opening 302 for different shaped transducers 402. Alternatively, the transducer face opening 302 can be fitted with an adapter (not shown) which reduces the size of the effective opening and/or changes the shape and geometry of the effective opening. This feature enables the use of a variety of different shape and size transducers 402 to be used when retro fitting and upgrading of the vessel 100.

Peak pressure resulting from the detonation of an explosive charge under water falls inversely with distance from the charge (see Shock and Detonation Waves, John G. Kirkwood, Gordan and Breach Science Publishers, 1967). TNT, Tritonal, Minol, Torpex, Tetryl, Torpex II, Minol II, DBX, various Pentanols and Pentolite are some of the energetic materials tested to establish pressure, time and distance relationships. For example, a 300 lb. charge of cast TNT with a radius of 11 inches generates an approximate absolute pressure of 1 long ton/sq. in. at a distance of 50 feet after a 0.71 millisecond decay time of initial detonation.

A thin plate supported between two fluids behaves under impact of an acoustic wave advancing in one of the fluids like a damped membrane under tension equal to the yield of the material. Damage produced by an exponential wave is proportional to its momentum. Only a fraction of momentum is effective. This fraction depends on the ratio of decay time of the wave to a "plastic time" of the plate. The "plastic time" is determined by the dimensions of the plate and the yield stress of the plate material. As long as the rate of strain is positive a plastic diaphragm behaves like a membrane under a constant tension equal to the product of its thickness and the yield of the material of which it is compressed.

When the rate of strain at the center of a diaphragm changes sign, an unloading wave is propagated to the edge, leaving the diaphragm with a permanent dish. Failure occurs if the maximum strain at the center exceeds a critical value, approximately equal to the rupture strain of the material in a linear tensile test. backing of the plate by a fluid of high density and high acoustic velocity diminishes plate damage.

The present invention transducer modular mounting system provides a "universal" mounting system that is built into the vessel hull at the time of manufacture, wherein one cage and housing geometry supports the majority of commercial and military transducers. The system allows maintenance and replacement of transducers without additional fiberglass and/or welding to the vessel hull 102. The system provides protection to the transducer 402 from mechanical and acoustic sources of damage (both military and commercial). The system is non-magnetic and provides over-pressure setting adjustability. The system is applicable both to fiberglass hulls and metal hulls.

Essentially, pressure generated from mechanical or acoustic sources acts against the transducer face. Acting as the center of a diaphragm, the transducer and its retaining plate begin dissipating energy by serial compression of the gas struts and the retainer springs. In parallel with this action, at a specific preset pressure, the transducer face or the transducer adapter plate (if one is used) to the cage main support plate will temporarily open to a maximum preset limit, allowing a stream of seawater to enter the hermetically sealed internal hull housing volume, compressing the volume of contained gas (initially at atmospheric pressure) to a pressure peak below the internal housing failure pressure limit. This is accomplished through the use of a fast acting, adjustable setting purge/relief value combination.

As the pressure decreases against the transducer face the junction between the transducer face or the transducer adapter plate (if one is used) and the cage main support plate will reseal watertight. The internal hull housing volume can then be purged of retained seawater. The purging can be accomplished through application of pressurized air or a gas such as nitrogen through the purge/relief valve.

The value of the spring constants and strut dampening coefficients for the compression springs 310, a combination of gas struts and springs in parallel as well as in series are selected so that the maximum impact sustained by the transducer will be below the level which would destroy it while they are selected suitably high to limit the breaching of the internal hull housing by sea water.

By using the transducer specifications, vessel hull specifications and explosive curves, based on a particular intended use of the vessel, the proper spring and strut combinations can be selected. Maximum transducer force pressure remains below that which would destroy it while minimizing seawater entry to the internal hull housing through the use of variable (progressive) spring force rates. The spring force combination is selected by determining the minimum radial distance the vessel will be allowed to enter from the anticipated source of detonation. This distance is relative to the (worst case) intensity (amount and type) of explosive contained within the explosive device and the structural properties of the vessel hull. These curves are known to exist (or can be determined as necessary) for the combination of vessels and explosive devices considered state of the art.

Figure 8:
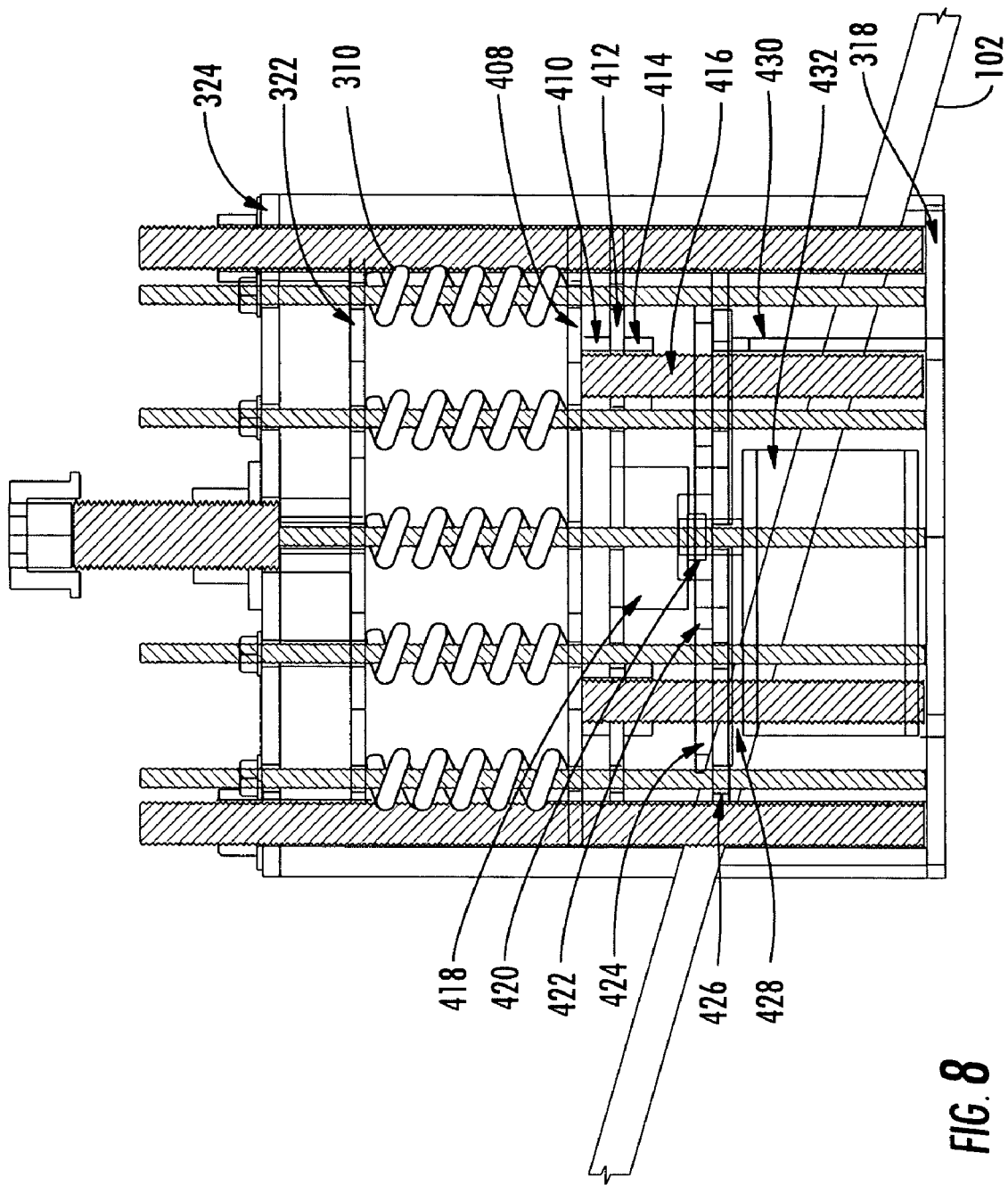
FIG. 8 is a cross sectional view of a portion of the vessel hull showing another embodiment of the transducer modular mounting system looking from the bow towards the stern under the vessel with the transducer and support cage installed; and, FIG. 9 is a drawing of a portion of the vessel hull showing another embodiment of the transducer modular mounting system looking from the top down into the hull.
Figure 9:
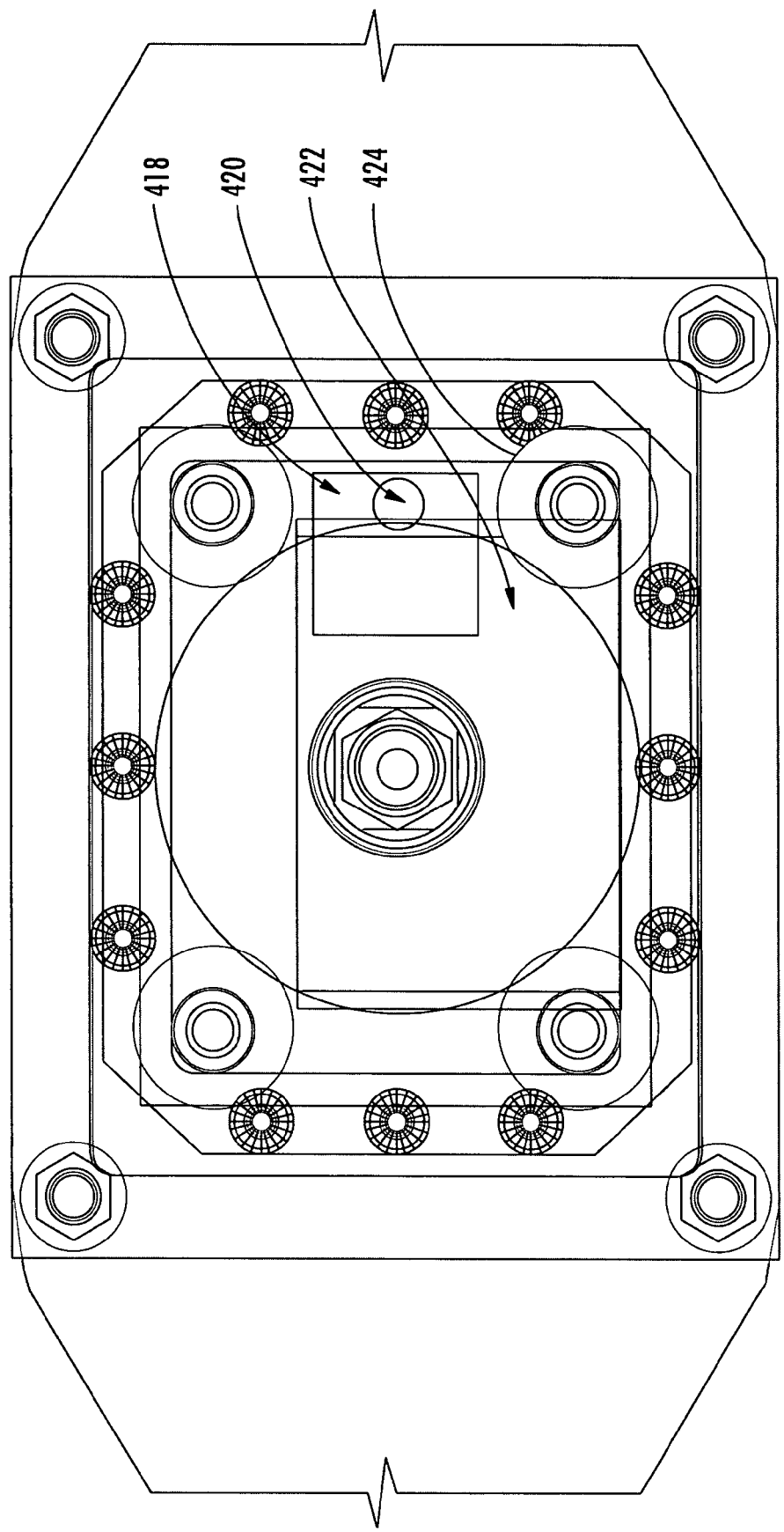

Referring to FIGS. 8 and 9 there is shown an alternative embodiment of the present invention. This alternative embodiment of the vessel hull transducer modular mounting system allows the use of side scan sonar (SSS), forward looking sonar, bottom scan sonar, 360° sweep sonar and searchlight sonar implementation (in both or either single deployment or phased array duplex modes) while maintaining the advantage of impact and concussion resistance to damage of the transducer arrays in both the extended and retracted positions.

Although the alternative embodiment of the present invention is particularly well suited for use with sonar transducers and is so described herein, it is equally well suited for other types of transducers and transducer arrays.

This allows for the use of high-speed surface craft in various modes of operation since in the retracted position the side scan housing is flush with the hull exterior fairing. Such craft are able to cover large distances in short times between searches while maintaining both high-resolution imaging capability and significant protection from impact and concussion damage.

When the 360° sweep housing, forward looking housing, or searchlight housing is fitted in lieu of the side scan housing module and operated in phased array mode a three-dimensional identification and analysis of threat conditions proximal to the vessel may be produced.

Referring to FIG. 8 there is shown a drawing in cross sectional view of a portion of the vessel hull showing the transducer modular mounting system looking from the bow towards the stern under the vessel with the transducer and support cage installed. Referring to FIG. 9 there is shown a drawing of a portion of the vessel hull showing the transducer modular mounting system looking from the top down into the hull.

Actual operation of the side scan and 360 sweep modules begins with energizing the gear-motor drive 418. Drive gear pinion 420 on the gear-motor turns the main drive gear 422. Main drive gear 422 turns the four planetary jackscrew fixed spur gears 424 which are a permanent (fixed) part of the jackscrew(s) 416.

Each of the four jackscrews 416 rotates in a fixed vertical axis and is held in this position by the jackscrew retention bearing 410 which is a permanent (fixed) component of the jackscrew retention bearing plate 408. The jackscrew retention bearing plate 408 is positioned by the compression springs 310, slide bushing 312, thrust plate 322 and limit nuts (not shown) in compression and by adjustment nuts 314 (not shown) in tension.

The rotation of jackscrew 416 synchronously moves jackscrew bearing 414 and side scan transducer array housing jackscrew bearing 428. The rotation of jackscrew bearings 414 and 428 drive the entire side scan module along the four jackscrews 416.

The side scan module movement (in deployment) places side scan transducer array housing 430 containing the side scan array housing cavity 432 for the transducer array with the attendant acoustic aperture below the hull fairing surface facing outboard of the vessel and perpendicular to the vessel direction of travel.

The side scan module movement (in retraction) places side scan transducer array housing 430 containing the side scan array housing cavity 432 for the transducer array with the attendant acoustic aperture above the hull fairing surface within the interior housing.

While the system is shown with simple compression springs 310, a combination of gas struts and springs in parallel as well as in series can be used as energy absorption devices. In addition to coil springs, leaf springs, and other suitable resilient materials can be used. The compression springs 310 can also be selected with a variable progressive spring constant.

Values for the spring constants and strut dampening coefficients may be adjusted specific to the vessel mission.

The base values to be used should be Impulse based, not bubble energy based and factored for both incident and normal energy transfer. Standard seawater molality and sets of empirical values (for a given temperature and shock wave velocity) from the published literature provide a significantly wide range of momentum transfer.

The surface area (in the retracted position) exposed to underwater shock has been held constant for all five configurations of the vessel hull transducer modular mounting system.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications, which come within the scope of the appended claims, is reserved.

What is claimed is:

1. A modular mounting system comprising:
   a support cage mounted to a surface;
   a support plate attached to the support cage, the support plate positioned on the surface;
   a retention plate moveably coupled to the support cage;
   an energy absorption device coupled between the retention plate and the support cage;
   wherein the energy absorption device biases the retention plate, the retention plate operative to retain an object against the support plate;

whereby a retained object can be replaced without modification of the surface or alteration of integrity of the surface and whereby an effective life of the retained object is extended by reducing and dampening shock impact on the retained object.

2. The modular mounting system as recited in claim 1 further comprising a device for extending and retracting the object retained against the support plate by the energy absorption device.

3. The modular mounting system as recited in claim 2 wherein the device for extending and retracting the object is a mechanical screw mechanism.

4. The modular mounting system as recited in claim 1 wherein the energy absorption device is at least one compression spring.

5. The modular mounting system as recited in claim 4 wherein the at least one compression spring has a variable progressive spring constant.

6. The modular mounting system as recited in claim 1 wherein the energy absorption device is at least one compression spring and at least one gas strut in parallel with the at least one compression spring.

7. The modular mounting system as recited in claim 1 wherein the energy absorption device is a resilient material.

8. The modular mounting system as recited in claim 1 further including a transducer, wherein the transducer is the retained object.

9. The modular mounting system as recited in claim 1 further including a sensor, wherein the sensor is the retained object.

10. The modular mounting system as recited in claim 1 wherein the retained object is a camera or an optical system.

11. A vehicle comprising:
a contoured surface defining a vehicle exterior and a vehicle interior; and
an integral modular mounting system including
a support cage mounted to the contoured surface;
a support plate attached to the support cage, the support plate positioned on the surface;
a retention plate moveably coupled to the support cage;
an energy absorber coupled between the retention plate and the support cage, the energy absorber biasing the retention plate;
wherein the retention plate is operative to hold a retained object against the support plate, the energy absorber reducing and dampening shock impact on the retained object.

12. The vehicle with an integral modular mounting system as recited in claim 11 further comprising a device for extending and retracting the object held against the support plate by the energy absorber.

13. The vehicle with an integral modular mounting system as recited in claim 12 wherein the device for extending and retracting the transducer is a mechanical screw.

14. The vehicle with an integral modular mounting system as recited in claim 11 wherein said energy absorber is a compression spring.

15. The vehicle with an integral modular mounting system as recited in claim 14 wherein the compression spring has a variable progressive spring constant.

16. The vehicle with an integral modular mounting system as recited in claim 11 wherein the energy absorber is at least one compression spring and at least one gas strut arranged in parallel with the at least one compression spring.

17. The vehicle with an integral modular mounting system as recited in claim 11 wherein the energy absorber is a resilient material.

18. A method for outfitting a vehicle with a modular mounting system, the method comprising:
adapting a surface of the vehicle for receiving the modular mount system;
providing a modular mounting system including
a support cage;
a support plate attached to the support cage;
a retention plate moveably coupled to the support cage;
an energy absorber coupled between the retention plate and the support cage, the energy absorber biasing the retention plate; the retention plate operative to hold a retained object against the support plate, the energy absorber operative to reduce and dampen shock impact on the retained object; and
mounting the support cage to the surface of the vehicle; the support plate positioned on the surface.

19. The method for outfitting a vehicle as recited in claim 18 further comprising adjusting spring constants or strut dampening coefficients of the energy absorber to a predetermined setting.

20. The method for outfitting a vehicle as recited in claim 18 further comprising extending and retracting the retained object held against the support plate by the energy absorber.

* * * * *